United States Patent [19]
Zona

[11] Patent Number: 4,776,229
[45] Date of Patent: Oct. 11, 1988

[54] DEVICE FOR CONTROLLING THE RECTILINEAR TRANSLATION OF A MOVABLE MEMBER

[75] Inventor: Mauro Zona, Torino, Italy

[73] Assignee: D. E. A. Digital Electronic Automation S.p.A., Corso Torino, Italy

[21] Appl. No.: 95,352

[22] Filed: Sep. 10, 1987

[30] Foreign Application Priority Data

Sep. 19, 1986 [IT] Italy ................. 53 851-B/86

[51] Int. Cl.$^4$ ............................. F16H 25/24
[52] U.S. Cl. ................. 74/424.8 R; 74/459; 74/468; 384/107; 384/124
[58] Field of Search ............ 74/424.8 R, 459, 468; 384/107, 111, 114, 124

[56] References Cited

U.S. PATENT DOCUMENTS 3,171,295  3/1965  Benckert .............. 74/424.8 R
4,586,394  5/1986  Perkins ................... 74/468

FOREIGN PATENT DOCUMENTS 58-166162 10/1983  Japan .............. 74/424.8 R
58-166161 10/1983  Japan .............. 74/424.8 R
1470784    4/1977  United Kingdom .......... 74/459

Primary Examiner—Allan D. Herrmann
Attorney, Agent, or Firm—Albert L. Jeffers; Jeffers, Hoffman & Niewyk

[57] ABSTRACT

A device for controlling the rectilinear translation of a movable member, comprises a screw engaged by a nut having cooperatingly shaped thread surfaces the dimensions of which are such that there is a radial clearance between the screw and the nut and an axial clearance between adjacent helical flanks of the screw and the nut. The nut is provided with radial passages communicating with the chambers defining the radial clearances, which can be put into communication with a source of compressed gas enabling the formation of an air cushion or air bearing between the two relatively movable members thereby reducing the turning moment necessary for effecting rectilinear movement of the movable member.

2 Claims, 2 Drawing Sheets

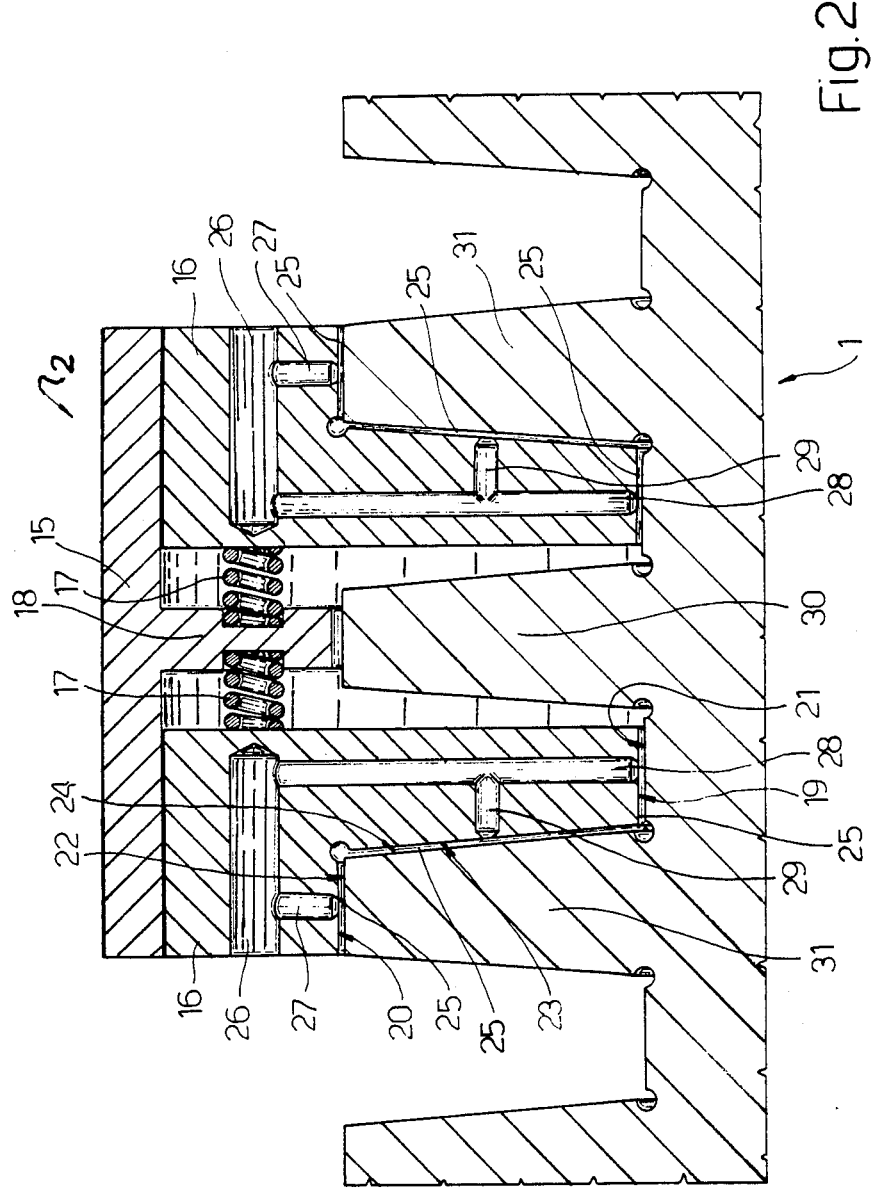

DEVICE FOR CONTROLLING THE RECTILINEAR TRANSLATION OF A MOVABLE MEMBER

BACKGROUND OF THE INVENTON

The present invention relates to a device for controlling the rectilinear translation of a movable member, in particular a slide of a measuring machine, by means of which the movements of the movable member can be achieved with extremely low friction and very high precision.

It is known that to control the rectilinear translation of a movable member a pair of elements comprising a screw and a nut are usually utilised, to a first of which the movable member is fixed whilst the second is made to rotate by suitable drive means; normally, the movable member is axially connected to the screw, whilst the nut can turn with respect to the base of the machine but is axially restrained with respect to the base itself.

Although, with control devices of this type, even very high actuating forces can be transmitted to the movable member, and the displacements of this can be achieved with a good precision, there are nevertheless various disadvantages. In fact, rather high actuating forces on the nut are required, supplementary devices are necessary for ensuring a correct lubrication of the contacting surfaces of the screw and the nut, and normally deformations are induced which limit the application of this device in certain fields, for example in that of measurement machines. These disadvantages are a consequence of the high sliding friction which is generated between the contacting surfaces of the screw and the nut, in particular when large forces are required for the displacement of the movable member; to reduce the friction it is necessary to provide a very efficient lubrication, but even so, control of the displacement of the movable member requires rather high actuating couples which produce unacceptable deformations and which require very large dimensions of the various parts of the device which therefore makes them bulky.

SUMMARY OF THE INVENTION

The object of the present invention is that of providing a device for controlling the rectilinear translation of a movable member, which will be free from the disadvantages which have been listed above.

This object is achieved by means of a device characterised by the fact that it comprises a pair of elements in the form of a nut and a screw to a first of which the said movable member is fixed whilst the second is rotatable by drive means, each of the said elements being provided with surfaces which are positioned laterally of corresponding surfaces of the other element, at least one pair of the said surfaces being shaped in such a way as to leave between them a predetermined clearance to form a chamber, a source of gas or a mixture of gases under pressure, and a duct operable to put the said source into communication with the said chamber to supply the said gas thereto and create a layer of gas under pressure between the surfaces of the said pair of elements.

BRIEF DESCRIPTION OF THE DRAWINGS

For a better understanding of the present invention a more detailed description thereof will now be given by way of example with reference to the attached drawings in which:

FIG. 2 is a partial longitudinal section of a device formed as a second embodiment of the invention.

DETAILED DESCRIPTION OF THE INVENTION

Figure 1:
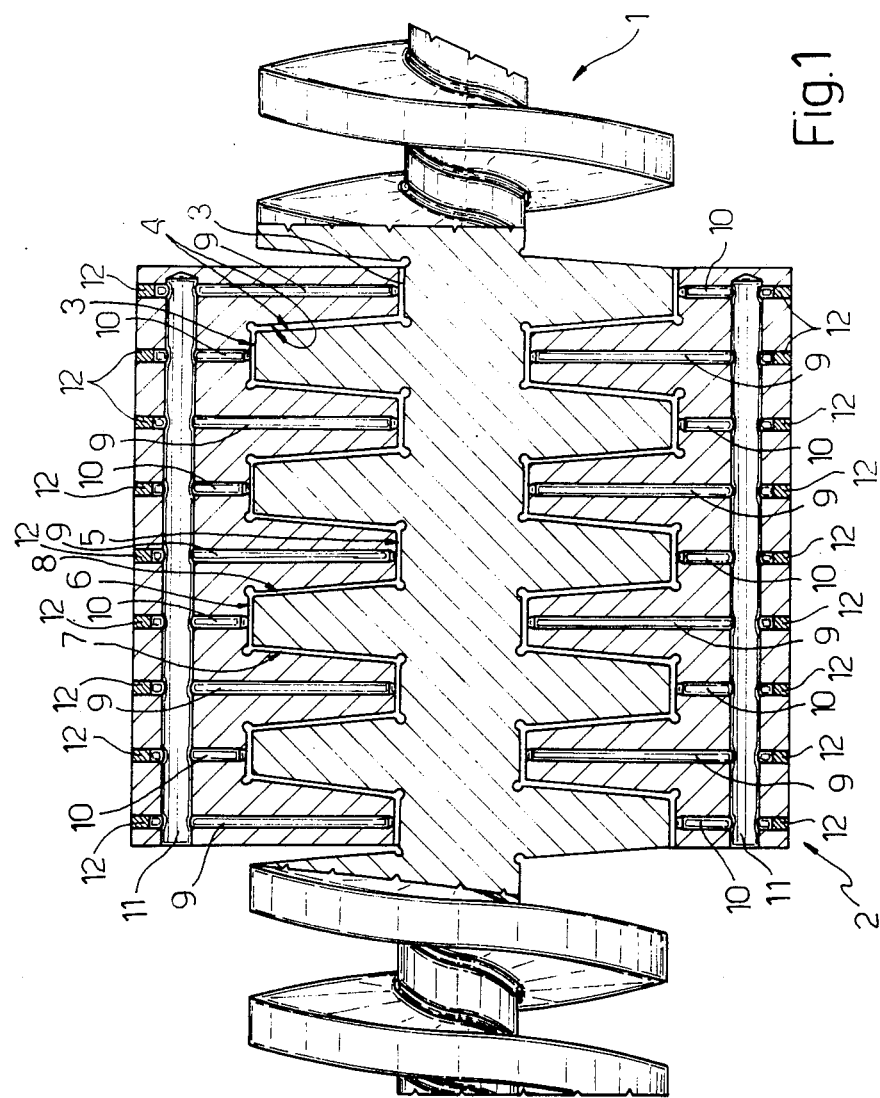
FIG. 1 is a longitudinal section of a device made according to the principles of the present invention, corresponding to a first embodiment thereof.

The device of the invention is able to control the rectilinear translation of a movable member, for example the slide of a machine tool or a measurement machine, and comprises a pair of elements in the form of a nut and a screw indicated in FIG. 1 respectively with the reference numerals 1 and 2; one of these, normally the screw, is fixed in any convenient manner to the movable member, whilst the second, normally the nut, is caused to rotate by suitable control means which have not been shown. The element of the pair which is made to rotate is axially fixed, in any appropriate manner, with respect to the frame of the machine of which the device forms part.

Conveniently, but not necessarily, the cross-section of the threads of the screw 1 and the nut 2 is trapezoidal as has been shown in FIG. 1; it is, however, evident that the cross-section of these threads can be of different form, for example triangular. Where the section of the threads is trapezoidal each of these is delimited internally and externally by cylindrical surface portions 3 and laterally by helical surface portions 4; these surfaces are shaped in such a way as to leave predetermined clearances between corresponding surfaces of the screw element 1 and nut element 2 able to form a first helical chamber 5 in correspondence with the bottom of the thread of the screw element 1, a second helical chamber 6 in correspondence with the crest of the thread itself, a third and a fourth helical chamber, respectively 7 and 8, in correspondence with the flanks of the screw itself. The said chambers, as is clearly seen in FIG. 1, are all in communication with one another.

The device further includes a source of gas or a mixture of gases under pressure (not shown) and conduits operable to put this source into communication with the said chambers for the purpose of supplying gas to these and creating a layer of gas under pressure between the corresponding surfaces of the pair of elements.

Conveniently, the said ducts are formed partially within the nut element 2 and comprise two series of radial holes 9 and 10: the holes 9 open into the first chamber 5 and the holes 10 open into the second chamber 6 and both the series of holes are in communication with other axial holes 11 formed in the nut element 2. Conveniently, for technical reasons, the holes 9 and 10 are made as through holes in the nut 2 and subsequently closed with suitable end plugs 12.

In the embodiment of FIG. 2 the nut element 2 comprises a sleeve 15 and a pair of rings 16 axially movable within it and thrust axially of the sleeve in opposite directional senses by the action of resilient means; these latter can be constituted by two series of springs 17 which engage on a central projection 18 of the sleeve itself.

Each of the rings 16 includes at least a first and a second cylindrical surface portion respectively 19 and 20, having diameters greater than the diameters of the cylindrical surface portions which delimit the thread of the screw internally and externally respectively and which, in FIG. 2, have been indicated 21 and 22; each ring further includes a third helical surface portion 23 disposed laterally of the helical surface 24 which delimits the thread of the screw 1 on one side. The first, second and third surface portions 19, 20 and 23 are shaped in such a way that between them and the corresponding surfaces of the screw there are formed chambers 25 for the gases under pressure.

In each ring 16 there is formed a series of both axial and radial holes 26, 27, 28 and 29 which can put the source of fluid under pressure into communication with the chambers 25.

As is clearly seen in FIG. 2, the length of the sleeve 15 is chosen in such a way that it corresponds substantially to the length of three threads of the screw 1 to leave a central thread 30 within the sleeve itself and to have the rings 16 thrust, by the action of the springs 17, against the threads 31 contiguous therewith.

The operation of the device described is as follows.

During the rest condition of the device there is no gas under pressure within the interior of the chambers 5, 6, 7 and 8 (FIG. 1) and 25 (FIG. 2) and therefore parts of the cylindrical and helical surfaces of the screw element 1 and nut element 2 can come into contact with one another if there exist no other external constraints which impede the occurrence of this condition.

When the device is activated by the introduction of gas under pressure into the interior of the said chamber there is generated a layer of air under pressure between the corresponding surfaces of the screw and nut elements and therefore the two elements of the pair assume the configuration which has been shown in FIGS. 1 and 2 in which the screw is pneumatically supported with respect to the nut by the action of the pressure which acts on the cylindrical and helical surfaces of the screw itself; because of the substantial axial symmetry of these surfaces the resultant of the pressures which act on them is substantially nil in any direction orthogonal to the axis of the screw and therefoe this latter is perfectly centred with respect to the nut. Now, upon controlling the rotation of the nut 2 translation of the screw is controlled, as in any type of screw and nut pair, with the difference, however, that the cylindrical and helical surfaces of the two elements of the pair are prevented from coming directly into contact with one another: during translation of the screw with respect to the nut the layer of gas under pressure within the chambers 5, 6, 7 and 8 (FIG. 1) and 25 (FIG. 2) is maintained substantially unchanged. It is therefore evident that the movement of the screw with respect to the nut can be achieved with considerable precision and with extremely low friction, direct contact between the surfaces of the two elements of the pair being prevented.

In the case of the embodiment of FIG. 2, during the rest condition of the device the springs 17 normally hold the rings 16 against the corresponding helical surfaces 24 of the threads 31 of the screw 1, whilst when gas under pressure is introduced into the interior of the ducts 26, 27, 28 and 29 the force exerted by the springs 17 is overcome and then the surfaces 23 of the rings become spaced from the corresponding surfaces 24 of the threads to form the helical chambers 25 for the compressed air.

It is therefore evident that with the device of the invention, as well as obtaining very precise displacements of the movable member controlled by the screw, with extremely low friction, supplementary devices for lubrication of the surfaces of the two elements of the pair are not required, and control of the translation of the screw requires only very low driving couple on the nut 2. Consequently significant deformations of the elements of the device are not induced. It is evident that the embodiments of the device which have been described can have modifications and variations introduced thereto without departing from the scope of the invention.

In particular, the nut 2 of the embodiment of FIG. 1 rather than being made in a single piece in the form of a sleeve, could be made by means of several sectors divided along a diametral plane of the nut itself and can further be provided with means operable to hold the various sectors of which the nut is constituted together; an embodiment in which the nut is constituted solely by two parts divided along a diametral plane could be particularly convenient.

I claim:

1. A device for controlling the rectilinear translation of a movable member, comprising a pair of nut and screw elements to a first of which said movable member is fixed whilst the second is rotatable by control means, each of said elements being provided with surfaces which are positioned facing a corresponding surface of the other element, at least one pair of said surfaces being shaped in such a way as to leave between them predetermined clearances to form a first chamber and a second chamber, a source of gas under pressure, ducts operable to put said source into communication with said first and second chambers to supply said gas thereto and create a layer of gas under pressure between the surfaces of said pair, said duct formed in said nut element and including two series of radial holes formed in said nut, the holes of one of said series opening into said first chamber and the holes of the other series opening into said second chamber, and said radial holes communicating with axial holes formed in said nut.

2. A device for controlling the rectilinear translation of a movable member, comprising a pair of nut and screw elements to a first of which said movable member is fixed whilst the second is rotatable by control means, each of said elements being provided with surfaces which are positioned facing a corresponding surface of the other element, the threads of said nut and screw elements being delimited internally and externally by cylindrical surface portions and laterally by helical surface portions, a source of gas under pressure, said nut element including a sleeve and at least one pair of rings movable axially therein and thrust in the axial direction of the sleeve in opposite directional senses by action of resilient means, each of said rings including at least first and second cylindrical surface portions having diameters greater than the diameter of the said cylindrical surface portions which respectively delimit the thread of said screw internally and externally, a third helical surface portion disposed laterally of the said helical surface portion which delimits one side of the thread of said screw, said first, second and third surface portions being shaped in such a way that chambers for said gas are formed between them and the corresponding surfaces of said screw, and ducts operable to put said source of gas into communication with said chambers to supply said gas thereto and create a layer of gas under pressure between the surfaces of said pair of nut and screw elements.

* * * * *

UNITED STATES PATENT AND TRADEMARK OFFICE
CERTIFICATE OF CORRECTION

PATENT NO. : 4,776,229

DATED : October 11, 1988

INVENTOR(S) : Mauro Zona

It is certified that error appears in the above-identified patent and that said Letters Patent is hereby corrected as shown below:

Col. 3, line 39, change "therefoe" to --therefore--;
Claim 1, Col. 4, line 33, change "duct" to --ducts--.

Signed and Sealed this

Twenty-eighth Day of February, 1989

Attest:

DONALD J. QUIGG

*Attesting Officer*  *Commissioner of Patents and Trademarks*